United States Patent [19]

Carson et al.

[11] Patent Number: 4,988,782
[45] Date of Patent: Jan. 29, 1991

[54] ALKENE POLYMERIZATION PROCESS AND CATALYST COMPOSITIONS THEREFOR

[75] Inventors: Ian G. Carson; Petrus A. Bentvelsen, both of Amsterdam, Netherlands

[73] Assignee: Shell Internationale Research Maatschappij, B.V., Hague, Netherlands

[21] Appl. No.: 426,289

[22] Filed: Oct. 25, 1989

[30] Foreign Application Priority Data

Oct. 26, 1988 [GB] United Kingdom ............... 8825056

[51] Int. Cl.$^5$ .......................................... C08F 4/655
[52] U.S. Cl. ................................. 526/125; 526/351; 502/108; 502/110
[58] Field of Search .............................. 526/125, 153

[56] References Cited

U.S. PATENT DOCUMENTS

| 4,347,158 | 10/1982 | Kaus et al. | 526/125 X |
| 4,461,846 | 7/1984 | Harris et al. | 526/125 X |
| 4,618,661 | 10/1986 | Kaus et al. | 526/125 X |

FOREIGN PATENT DOCUMENTS 1536358  12/1978  United Kingdom .

Primary Examiner—Patrick P. Garvin

[57] ABSTRACT

Catalysts compositions enabling the production of polyalkenes with improved bulk density are prepared by combining the following catalyst components in the following order of addition: first introducing an electron donor component, then adding a reaction product of a di-alkylaluminium halide and a solid component comprising a magnesium di-halide, an electron donor and a halide of tetravalent titanium and lastly adding a tri-alkylaluminium compound.

2 Claims, No Drawings

ALKENE POLYMERIZATION PROCESS AND CATALYST COMPOSITIONS THEREFOR

This invention relates to a process for the preparation of catalyst compositions for alkene polymerization, for example polymerization of propylene or co-polymerisation of ethylene and propylene. British patent specification 1,536,358 is concerned with a process for the preparation of catalyst compositions for alkene polymerization, which comprises combining: (a) a solid catalyst component, comprising a magnesium-dihalide, an electron donor and a halide of tetravalent titanium, (b) a tri-alkylaluminium compound, (c) an electron donor, and (d) a di-alkylaluminium halide. Such catalyst compositions are prepared by simply adding the aforesaid four different components to each other; various orders of additions have been disclosed in the aforesaid patent and from runs 10 in Example 3, it is concluded that the best performing catalyst, in terms of the balance of production of isotactic polymer (xylene solubles) and polymer yield, is first introducing component (d), then adding component (a) and lastly adding a mixture of components (b) and (c).

Surprisingly, the Applicants have found that whilst maintaining an attractive balance of performance in terms of xylene solubles and polymer yield, the performance of the catalyst compositions is remarkably improved in terms of production of polymer having an attractive bulk density, when selecting a novel order of adding the four catalyst-forming components.

The present invention is concerned with a process for the preparation of catalyst compositions for alkene polymerization, which comprises combining: (a) a solid catalyst component, comprising a magnesium dihalide, an electron donor and a halide of tetravalent titanium, (b) a tri-alkylaluminium compound, (c) an electron donor, and (d) a dialkylaluminium halide, characterized in that the catalyst composition is prepared by combining the components in the following order of addition: first introducing component (c), then adding a reaction product of components (a) and (d), and lastly adding component (b).

In the solid catalyst component (a) the preferred magnesium dihalide is magnesium dichloride, which can be prepared by methods known per se including those comprising halogenating a magnesium dialkoxide, for example, magnesium diethoxide or a magnesium diaryloxide, for example, magnesium diphenoxide, by reacting with a halide of tetravalent titanium, for example, titanium tetrachloride.

Suitable electron donors for component (a) are esters, ketones, phenols, acylchlorides, amines, amides, phosphines and alcoholates as well as other compounds disclosed in British patent specification 1,389,890 and 1,559,194. Preferred donors are alkylesters of aromatic carboxylic acids, for example, ethyl- and methylbenzoate, p.methoxy-ethylbenzoate, p.ethoxy-ethylbenzoate, di-methylphthalate, di-isobutylphthalate, and di-n-propylphthalate.

The preferred halide of tetravalent titanium is titanium tetrachloride. Other halides are di-alkoxytitanium dihalides and di-aryloxytitanium dihalides, alkoxytitanium tri-halides and aryloxytitanium tri-halides. The aryl group in such compounds may carry two halogen atoms as substituents or two alkoxy-groups, for example, methoxy- or ethoxy-groups.

In component (a) the electron donor is usually present in a molar amount, calculated on magnesium atoms, of from 0.01 to 10, preferably from 0.1 to 3.0. The titanium compound is present in the solid catalyst component in a molar amount, calculated on magnesium atoms, of from 0.02 to 2.0, preferably of from 0.05 to 1.5.

In component (b) the preferred tri-alkylaluminium compounds are those in which each of the alkyl groups has from 1 to 8 carbon atoms, for example, tri-methylaluminium, tri-ethylaluminium, tri-n-propylaluminium, tri-isobutylaluminium, tri-amylaluminium and methyl di-isobutylaluminium. In the final catalyst composition this compound is preferably present in a molar amount, calculated on titanium atoms, selected within the range of from 20:1 to 200:1, preferably from 30:1 to 80:1.

The electron donors used as components (c) of the catalyst composition of this invention can be the same or different as those contained in component (a). Other suitable electron donors that may be used in component (c) are organic silicon compounds, including alkoxy-silanes and acyloxy-silanes of which specific examples include tri-methylmethoxy-silane, tri-phenylethoxy-silane, di-methyl-di-methoxy-silane and phenyl-tri-methoxy-silane. Preferred electron donors are alkyl esters of aromatic carboxylic acids, such as p.methoxyethylbenzoate and p.ethoxyethylbenzoate. Other preferred electron donors are phenyltri-ethoxy-silane and diphenyl-di-methoxy-silane.

Preferred proportions of electron donor to be used as component (c) in the catalyst compositions of this invention, calculated on component (b), are selected within the range of from 0.01:1 to 2.0:1, preferably from 0.1:1 to 0.8:1; preferred proportions of electron donor contained in catalyst component (a), calculated on a molar basis in respect of magnesium atoms contained in component (a), are suitably selected from the range of from 0.01:1 to 1:1 and preferably from 0.05:1 to 0.3:1.

Preferred components (d) are dialkylaluminium chlorides in which each of the alkyl groups have from 1 to 6 carbon atoms, for example di-methylaluminium chloride, di-ethylaluminium chloride and di-isobutylaluminium chloride. Preferred molar amounts of component (d), calculated on titanium atoms contained in solid catalyst component (a), are selected within the range of from 5:1 to 50:1, preferably from 10:1 to 30:1.

By definition the reaction between component (a) and component (d) in accordance with the invention is effected in the absence of components (c) and (b). The relevant reaction may be carried out in the presence of a hydrocarbon diluent such as pentane, heptane or iso-octane or in the presence of the monomer to be used in the subsequent polymerization reaction, for example, propylene. The temperature at which this reaction is carried out is not of critical importance; preferred temperatures are those lying in between 20° C. and 50° C. The reaction period will generally be selected within the range of from 2 min. to 200 min., preferably from 5 min. to 20 min. It is likewise not of critical importance whether the aforesaid components of the catalysts are added to the polymerization reactor or whether the formation of the catalyst composition by addition of the various components is effected in a storage vessel or in a supply line connected to the polymerization reactor.

The present invention is also concerned with a process for polymerizing an alkene, preferably a 1-alkene, such as butylene or more preferably propylene. These polymerizations may be carried out by any of the conventional techniques, for example slurry polymerization using liquid monomer or an inert hydrocarbon diluent as liquid medium. Polymerization can be both homopolymerization or co-polymerization of different alkenes, as an example thereof reference may be made to two-stage polymerization reactions of which the first stage comprises the production of a homo-polymer of propylene and the second stage comprises the production of a co-polymer of ethylene and propylene.

The performance of the catalyst system of this invention can be further improved by employing solid catalyst components as component (a) which have been subjected to a morphology control treatment, such as spray-drying or mechanical grinding or attrition under the action of a high-shear pump. An additional further improvement of the bulk density of the polymer can be obtained when combining the use of morphology-controlled solid catalyst components with pre-polymerization techniques, which are known per se. Preferably such pre-polymerization includes the polymerization at temperatures of less than 60° C. The amount of prepolymer to be produced therein is preferably selected within the range of from 0.05 to 5.0% weight of the polymer to be produced in the subsequent main polymerization reaction. The latter will normally be carried out at temperatures above 60° C., preferably at temperatures within the range of from 63 to 85° C.

The invention is further illustrated by working examples.

EXAMPLE 1

Magnesium ethoxide (5.72 g, 50 mmol) was stirred at room temperature with ethyl benzoate (2.4 ml, 16.7 mmol) and 75 ml of a 50:50 v toluene/chlorobenzene mixture as titanium tetrachloride (75 ml, 680 mmol) was added over the course of 10 mins. The mixture was brought to 110° C. and stirred for 60 mins. then filtered hot. The resulting solid was washed for 10 minutes each with two 60 ml portions of $TiCl_4$ at 110° C., filtered hot and then washed at room temperature with six 150 ml portions of isopentane.

To the slurry of solid product in isooctane diethylaluminium chloride was added in an amount of 20 mol per mol of titanium compound contained in the solid product. The resulting reaction mixture was kept under stirring during 10 minutes at 20° C. The solid catalyst component contained in the suspension is referred herein as component a.d.

Propylene was polymerized in a liquid bulk system using the following standard conditions:

component (b): triethylaluminium, Al:Ti ratio 80:1 mol.

component (c): p.ethoxy ethylbenzoate, Al:ester ratio 1.8:1 mol.

pressure: 2900 kPa.
temperature: 67° C.
$H_2$ concentration: 1.5% vol in gas cap.
Ti concentration: 0.27 mg Ti/l.
time: 1 hour.

Employing the solid catalyst component prepared as herein disclosed (=component a.d.), the order of adding components (b) and (c) was varied over runs A, B, C and D, the latter three serving as reference. In run A the addition order was: first component (c), then components (a.d.), then component (b). The order in runs B to D was respectively, first (a.d.), then (b), then (c), first (b), then (c), then (a.d.), first (a.d.), then mixture of (b) and (c).

Table I marks the relevant data:

TABLE I

| | Polymer Yield, kg/g | Xylene Solubles, % | Bulk Density, $g.ml^{-1}$ |
|---|---|---|---|
| run A | 20.5 | 3.8 | 0.43 |
| run B | 20.7 | 4.6 | 0.35 |
| run C | 19.6 | 4.0 | 0.38 |
| run D | 20.1 | 5.3 | 0.35 |

EXAMPLE 2

Catalyst components (a.d.), referred to in Example 1, was suspended in mineral oil and the slurry was subjected to grinding in a planetary ball mill (Fritsch Pulverisette, position 7) during 10 minutes. Observing the order of addition of run A in Example 1, the catalyst components were introduced into the polymerization reactor at the same conditions as set out in Example 1, except temperature of the liquid propylene monomer which was now kept at 35° C. to effect prepolymerization. After 5 minutes the temperature was raised to 67° C. over a period of 5 minutes. Bulk density of the polypropylene so produced after 1 hour polymerization was now 0.46 $g.ml^{-1}$; neither the hourly polymerization rate, nor the xylene solubles percentage were adversely affected.

What is claimed is:

1. A process for the polymerization of alkenes comprising polymerizing said alkenes under polymerization conditions in the presence of a catalyst composition prepared by a process which comprises combining:
   (a) a solid catalyst component comprising a magnesium dihalide, an electron donor and a halide of tetravalent titanium,
   (b) a tri-alkylaluminium compound,
   (c) an electron donor, and
   (d) a di-alkylaluminum halide, characterized in that the catalyst composition is prepared by combining the components in the following order of addition: -first introducing component (c), - then adding a reaction product of components (a) and (d), and - lastly adding component (b).

2. A process as claimed in claim 1, which is preceded by a prepolymerization at a temperature below 60° C., employing a catalyst composition prepared by the process as claimed in claim 5.

* * * * *